(12) United States Patent
Chen et al.

(10) Patent No.: US 6,545,889 B2
(45) Date of Patent: Apr. 8, 2003

(54) TRANSFORMERLESS AC/DC CONVERTING CONTROL CIRCUIT

(75) Inventors: Te-Cheng Chen, Hsin-Chu (TW); Johnny Yang, Hsin-Chu (TW); Hui-Hwa Chen, Chu-Pei (TW)

(73) Assignee: Macroblock, Inc., Hsin-chu (TW)

( * ) Notice: Subject to any disclaimer, the term of this patent is extended or adjusted under 35 U.S.C. 154(b) by 0 days.

(21) Appl. No.: 10/017,061

(22) Filed: Dec. 14, 2001

(65) Prior Publication Data

US 2002/0044471 A1 Apr. 18, 2002

(30) Foreign Application Priority Data

Aug. 20, 2001 (CN) .......................... 090120559

(51) Int. Cl.[7] ................................. H02M 7/00
(52) U.S. Cl. ........................................ 363/125
(58) Field of Search ................. 363/125, 127, 363/81, 84

(56) References Cited

U.S. PATENT DOCUMENTS

| | | | | |
|---|---|---|---|---|
| 4,709,322 A | * | 11/1987 | Mirow | 363/86 |
| 5,561,597 A | * | 10/1996 | Limpaecher | 363/59 |
| 6,061,259 A | * | 5/2000 | DeMichele | 363/125 |
| 6,300,748 B1 | * | 10/2001 | Miller | 323/266 |

* cited by examiner

*Primary Examiner*—Adolf Deneke Berhane
(74) *Attorney, Agent, or Firm*—K. David Crockett, Esq.; Crockett & Crockett

(57) ABSTRACT

The present invention discloses an AC/DC converting control circuit, which is used in transformerless AC/DC converting apparatuses. The control circuit primarily includes a current-switch circuit, a duty-control circuit and a load-current limiting circuit. When electrically connecting with a load and a voltage source in series, the control circuit of the present invention reduces the oscillation during on/off switching and provides a stable output current.

10 Claims, 6 Drawing Sheets

TRANSFORMERLESS AC/DC CONVERTING CONTROL CIRCUIT

BACKGROUND OF THE INVENTION

1. Field of the Invention

The present invention relates to an AC/DC converting control circuit and more particularly, to a transformerless AC/DC converting control circuit.

2. Description of the Related Art

Transformers are widely used to convert alternating current into direct current. However, the traditional transformers are so large as to take space and too heavy for users to carry. Therefore, transformerless AC/DC converting apparatuses have been developed.

In general, the on/off current of the transformerless AC/DC converting apparatuses can be controlled by a circuit as shown in FIG. 1, in which the SCR circuit includes transistors Tr1, Tr2 and Tr3. When the input voltage begins to increase, base potential of the transistor Tr1 becomes higher than emitter potential thereof and the transistor Tr1 is switched on. During the period that the input voltage increases continuously, the base potential of the transistor Tr3 remains higher than the emitter potential until the base potential is reduced by the transistor Tr2, and then the transistor Tr3 is switched on and the transistor Tr1 is switched off (Takeahi, etc., 1995, Tokyo Metropolitan Industrial Technology pp. 165–168, "LED Driver For Commercial Power"). Unfortunately, this design results in a serious oscillation problem, so that the output current cannot be well controlled by the transistor Tr1. FIG. 1A shows the unstable output voltage curve caused by the aforementioned oscillation, which further generates and accumulates undesired heat in the transistor Tr1.

Accordingly, the present invention provides a novel transformerless AC/DC converting control circuit to improve stability of the output current and thus prolong the life of the devices.

SUMMARY OF THE INVENTION

The object of the present invention is to provide a transformerless AC/DC converting control circuit, which has advantages of no oscillation, less heat accumulated, high efficiency, and longer life.

The transformerless AC/DC converting control circuit of the present invention with a load current flowing therethrough has a current input contact and a current output contact, which is suitable for illuminants, indicators, etc.

The control circuit primarily includes a current-switch circuit having a current input contact, a current output contact and a control contact, and being used to switch on/off and control the load current in accordance with received output signals from the duty-control circuit and the load-current limiting circuit; a duty-control circuit having a current input contact, a current output contact and a control contact, and being used to switch on or off the load current when a potential between the input and output contacts of the control circuit is lower or higher than predetermined values; and a load-current limiting circuit having a current input contact, a current output contact and a control contact, and being used to limit the load current in accordance with the current-switch circuit, when the load current is higher than a predetermined value.

Furthermore, the control contact of the duty-control circuit, the current input contact of the control circuit and the current input contact of the current-switch circuit are interconnected directly or indirectly by means of a conductive element. The current input contact of the load-current limiting circuit, the control contact of the current-switch circuit and the current input contact of the duty-control circuit are interconnected directly or indirectly by means of a conductive element. The current output contact of the current-switch circuit and the control contact of the load-current limiting circuit are interconnected directly or indirectly by means of a conductive element. The current output contact of the duty-control circuit, the current output contact of the load-current limiting circuit and the current output contact of the control circuit are interconnected directly or indirectly by means of a conductive element.

In general, the current-switch circuit primarily includes a first transistor and a first resistor; the duty-control circuit primarily includes a second transistor, a second resistor and a third resistor; and the load-current limiting circuit primarily includes a third transistor and a fifth resistor.

DETAILED DESCRIPTION OF THE PREFERRED EMBODIMENTS

Figure 2:
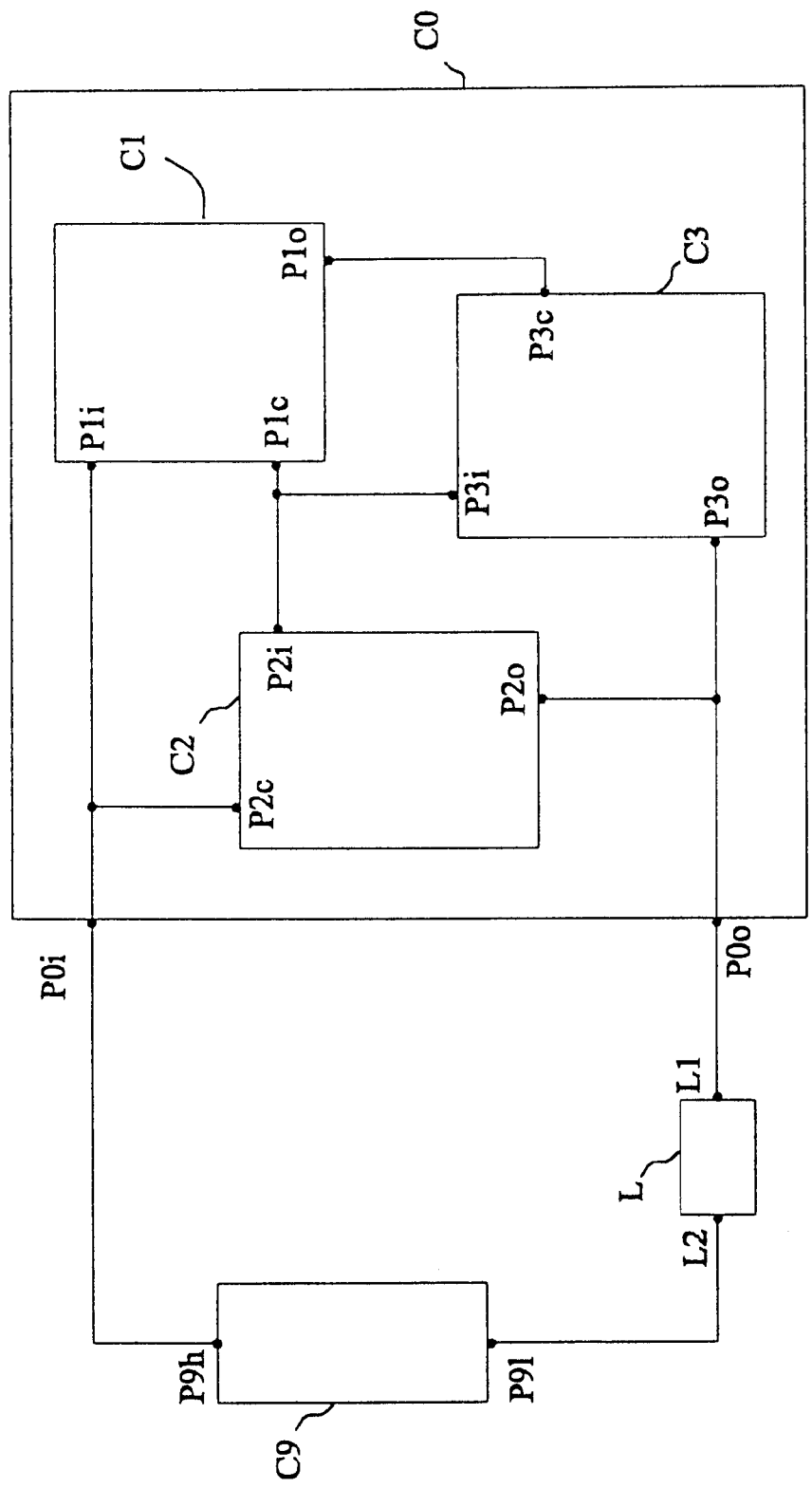
FIG. 2 shows a general block diagram of the improved AC/DC converter circuit.

FIG. 2 shows a general block diagram of a transformerless AC/DC converting control circuit C0 according to the present invention. A current flowing through the control circuit C0 is defined as a load current. The control circuit C0 has a current input contact P0$i$ and a current output contact P0$o$, which is electrically connected with a voltage source circuit C9 and a load L in series to convert AC to DC and further provide the load L a stable current.

The voltage source circuit C9 includes at least an AC source, and optionally includes a rectifier, for example, a full wave bridge rectifier. The load L having a current input end L1 and a current output end L2 may be connected between a low potential end P9$l$ of the voltage source circuit C9 and the current output contact P0$o$ of the control circuit C0 as shown in FIG. 2, or between a high potential end P9$h$ of the voltage source circuit C9 and the current input contact P0$i$ of the control circuit C0. The load L can be illuminants, indicators, etc., for example, LEDs.

The control circuit C0 primarily includes a current-switch circuit C1, a duty-control circuit C2 and a load-current limiting circuit C3. The current-switch circuit C1 has a current input contact P1$i$, a current output contact P1$o$ and a control contact P1$c$; the duty-control circuit C2 has a current input contact P2$i$, a current output contact P2$o$ and a control contact P2$c$; and the load-current limiting circuit C3 has a current input contact P3$i$, a current output contact P3$o$ and a control contact P3$c$.

In FIG. 2, the current-switch circuit C1 is used to switch on/off and control the load current in accordance with received output signals from the duty-control circuit C2 and the load-current limiting circuit C3. The duty-control circuit C2 is used to switch on or off the load current when a potential between the input and output contacts P0$i$, P0$o$ of the control circuit C0 is lower or higher than predetermined values. The load-current limiting circuit C3 is used to limit the load current in accordance with the current-switch circuit C1, when the load current is higher than a predetermined value.

In general, the control contact P2$c$ of the duty-control circuit C2, the current input contact P0$i$ of the control circuit C0 and the current input contact P1$i$ of the current-switch circuit C1 are interconnected directly or indirectly by means of a conductive element. The current input contact P3$i$ of the load-current limiting circuit C3, the control contact P1$c$ of the current-switch circuit C1 and the current input contact P2$i$ of the duty-control circuit C2 are interconnected directly or indirectly by means of a conductive element. The current output contact P1$o$ of the current-switch circuit C1 and the control contact P3$c$ of the load-current limiting circuit C3 are interconnected directly or indirectly by means of a conductive element. The current output contact P2$o$ of the duty-control circuit C2, the current output contact P3$o$ of the load-current limiting circuit C3 and the current output contact P0$o$ of the control circuit C0 are interconnected directly or indirectly by means of a conductive element. FIG. 2 shows one of the connecting types between these circuits that is completed by conductive wires.

Figure 3:
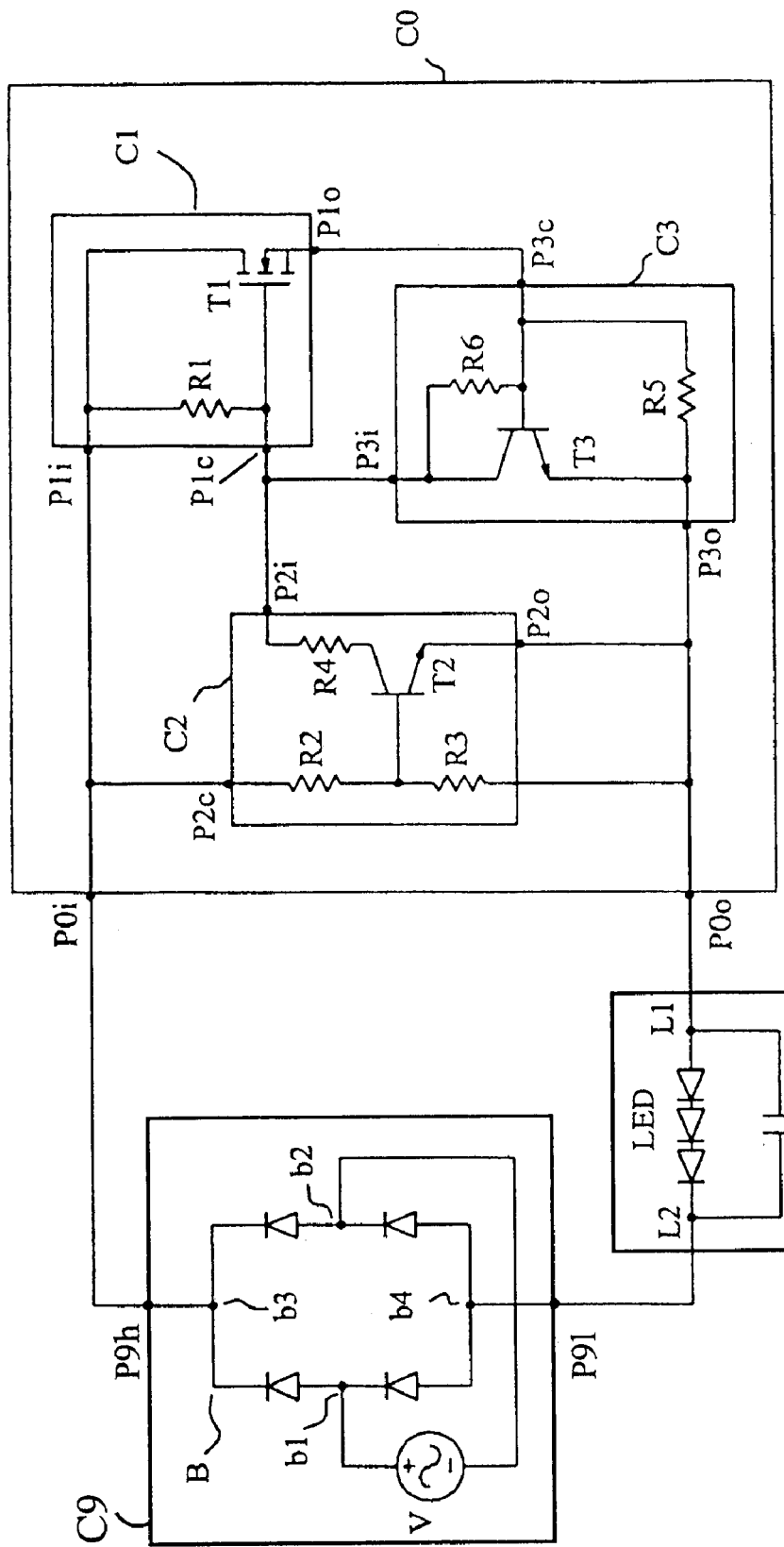
FIG. 3 shows the circuit of an embodiment of the improved AC/DC converter circuit including an N-type Power MOS transistor.
Figure 4:
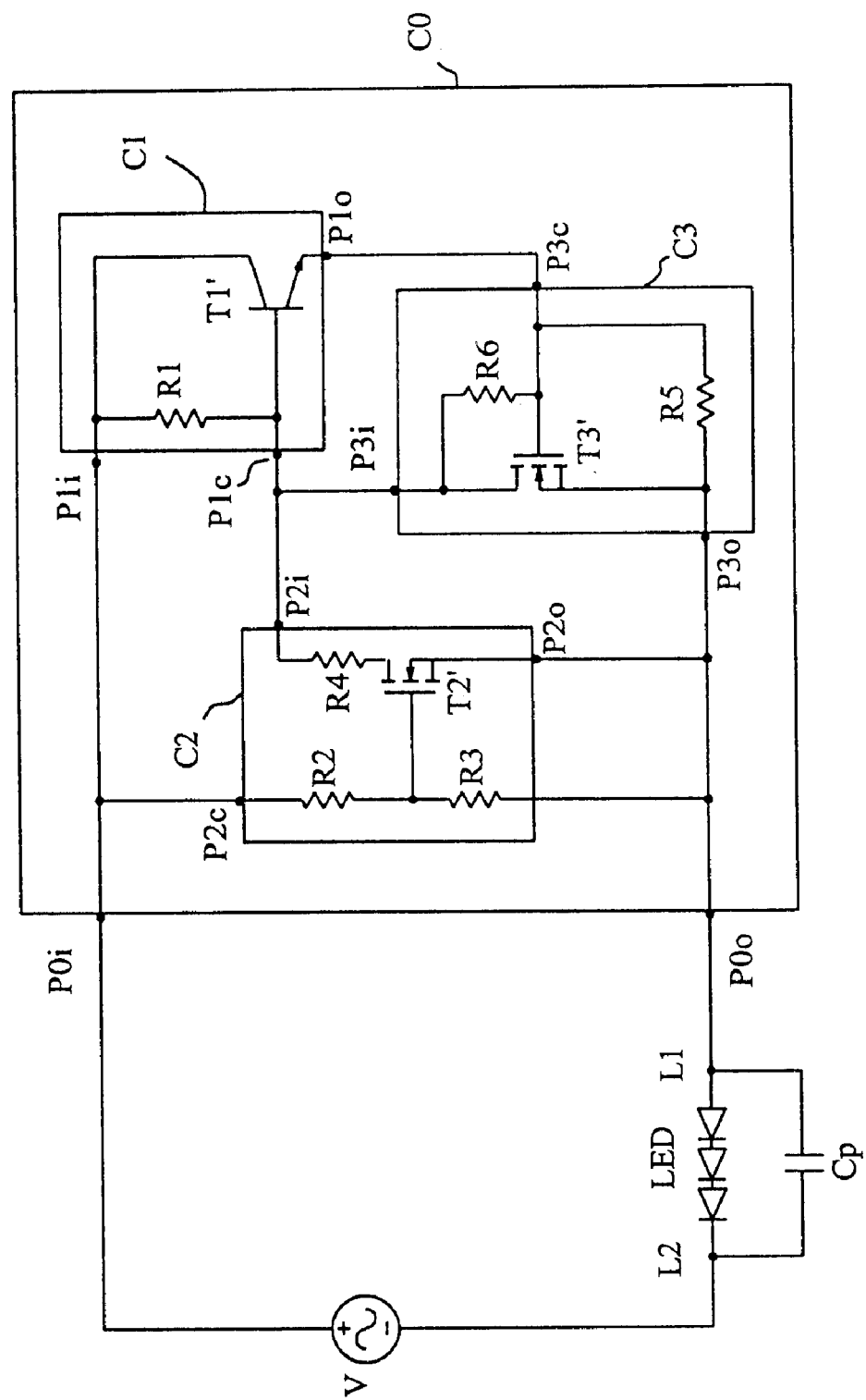
FIG. 4 shows the circuit of another embodiment of the improved AC/DC converter circuit including an NPN-type bipolar transistor.

Two embodiments of the general circuit are described here in reference to FIG; 3 and FIG. 4. FIG. 3 shows the circuit of an embodiment including an N-type Power MOS transistor according to the present invention. The current-switch circuit C1 includes a first transistor T1 and a first resistor R1, wherein the first transistor T1 is an N-type Power MOSFET having a source, a drain and a gate as a current output end, a current input end and a control end thereof, respectively. One end of the first resistor R1 is connected to a wire coupling the current input contact P1$i$ of the current-switch circuit C1 and the current input end of the first transistor T1, and another end is connected to a wire coupling the control contact P1$c$ of the current-switch circuit C1 and the control end of the first transistor T1. The current output end of the first transistor T1 is connected to the current output contact P1$o$ of the current-switch circuit C1.

Further, the duty-control circuit C2 includes a second transistor T2, a second resistor R2, a third resistor R3 and a forth resistor R4, wherein the second transistor T2 is an NPN-type bipolar transistor. The second transistor T2 has an emitter, a collector and a base as a current output end, a current input end and a control end. The forth resistor R4 has two ends respectively connected to the current input end of the second transistor T2 and the current input contact P2$i$ of the duty-control circuit C2. The current input end of the second transistor T2 is connected to the current input contact P2$i$ of the duty-control circuit C2. One end of the second resistor is connected to the control contact P2$c$ of the duty-control circuit C2. Another end of the second resistor R2 and one end of the third resistor R3 are connected to the control end of the second transistor T2. Another end of the third resistor R3 and the current output end of the second transistor T2 can be connected together to the current output contact P2$o$ of the duty-control circuit C2, or directly to the current output contact P3$o$ of the load-current limiting circuit C3 and the current output contact P0$o$ of the control circuit C0.

As for the load-current limiting circuit C3, it includes a third transistor T3, a fifth resistor R5 and a sixth resistor R6, wherein the third transistor T3 is also an NPN-type bipolar transistor. The transistor T3 has an emitter, a collector and a base respectively as a current output end, a current input end and a control end thereof. The current input end of the third transistor T3 is connected to the current input contact P3$i$ of the load-current limiting circuit C3. One end of the fifth resistor R5 is connected to the control contact P3$c$ of the load-current limiting circuit C3 and the control end of the third transistor T3, and another end of the fifth resistor R5 and the current output end of the third transistor T3 are connected to the current output contact P3$o$ of the load-current limiting circuit C3. Further, the sixth resistor R6 has two ends, wherein one end is connected to the wire coupling the control end of the third transistor T3 and the control contact P3$c$ of the load-current limiting circuit C3, and the other end is connected to the wire coupling the current input end of the third transistor T3 and the current input contact P3$i$ of the load-current limiting circuit C3.

Similarly, the connections between these contacts, transistors, resistors, etc. are not restricted, and can be directly connected together or indirectly connected by conductive wires as shown in FIG. 3.

In this embodiment, the voltage source circuit C9 includes a full wave bridge rectifier B having two input ends b1, b2 respectively connected to the anode and cathode of the AC source, a positive output end b3 and a negative output end b4 respectively forming the high potential end P9$h$ and the low potential end P9$l$ of the voltage source circuit C9. Additionally, serial LEDs are applied as the load L, and a capacitor Cp is used to smooth the impulsive output current by being electrically connected to the load L in parallel.

In the beginning of operation, the potential of the positive output end b3 of the rectifier B is low and no current flows therethrough. Next, the voltage status varies in order as the follows:

Status (I): The potential of the positive output end b3 increases from zero, and the gate potential of the first transistor T1 becomes higher than the source potential thereof, so that the first transistor T1 is switched on. Since the current flowing through the fifth resistor R5 lifts the base potential of the third transistor T3 to a conductive extent, the gate potential of the first transistor T1 is restricted by the third transistor T3, such that the current flowing through the fifth resistor R5 is constant due to containment between the first transistor T1 and the third transistor T3.

Status (II): The potential of the positive output end b3 gradually increases, and the current flowing through the second and the third resistor R2, R3 simultaneously increase, which eventually makes the second transistor T2 switch on and the gate potential of the first transistor T1 drop, thus switching off the first transistor T1.

Status (II): Potential of the positive output end b3 gradually decreases, and the current flowing through the third resistor R3 simultaneously decreases. By appropriately distributing voltage through the second and the third resistors R2, R3, the second transistor T2 can be switched off in good time and the first transistor T1 can be switched on by lifting the gate potential thereof, thereby turning on the LEDs again by supplying driving current. At the end of this period, the potential of the positive output end b3 reduces to zero, and the above statuses are repeated from Status (I).

Accordingly, by adjusting the ratios between the first and the fifth resistors R1, R5 and between the second and the third resistors R2, R3, the second and the third transistors T2, T3 can be switch on/off as desired, whereby the first transistor T1 can be driven and switched on/off, and a stable output current can be obtained.

Figure 1:
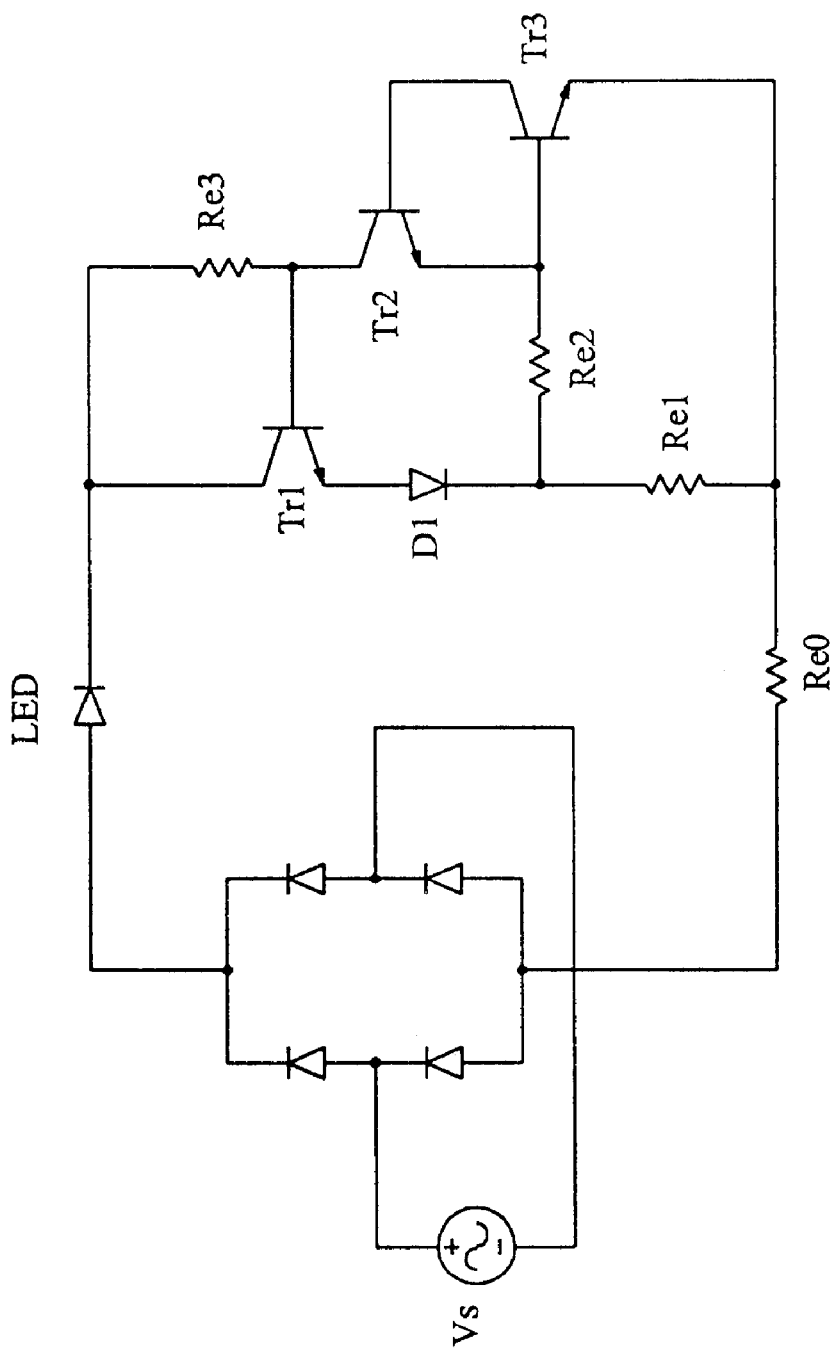
FIG. 1 shows a circuit of the prior art transformerless AC/DC converter.
Figure 1A:
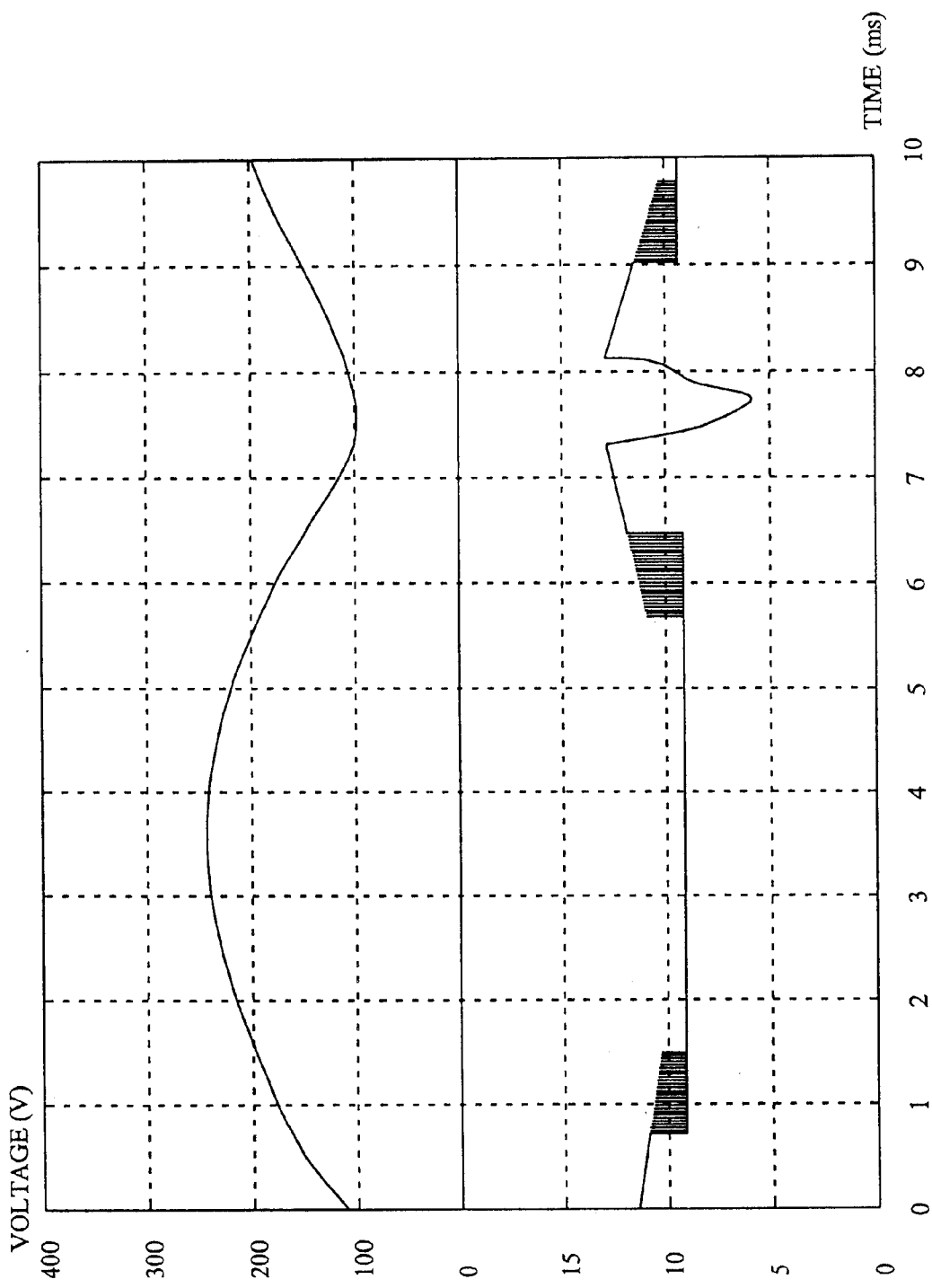
FIG. 1A shows voltage changes of the prior art circuit of FIG. 1.
Figure 3A:
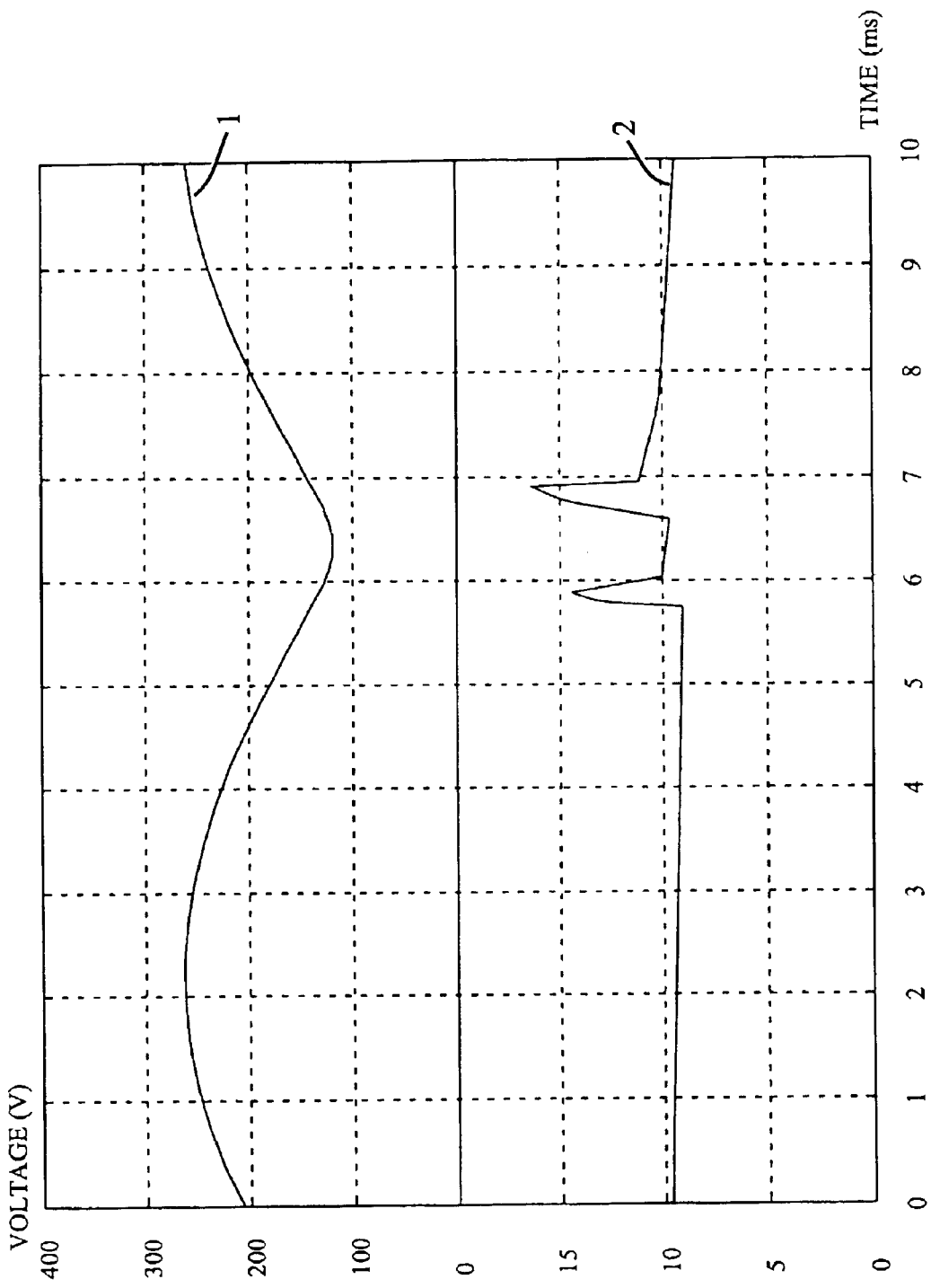
FIG. 3A shows voltage changes of the circuit of FIG. 3.

FIG. 3A shows voltage variations in accordance with the circuit of FIG. 3, in which the output voltage curve is obviously smoother than that in FIG. 1A. The present invention solves the oscillation problem of the prior art, and may further improve conductivity and prolong the life of the device.

FIG. 4 shows the circuit of another embodiment including an NPN-type bipolar transistor according to the present invention. In this embodiment, the first transistor T1' is an NPN-type bipolar transistor having an emitter, a collector and a base respectively as a current output end, a current input end and a control end thereof. The second and the third transistors T2', T3' are N-type MOSFETs, and each has a source, a drain and a gate respectively as a current output end, a current input end and a control end thereof. The connections between these devices and performances are similar to the embodiment shown in FIG. 3.

According to the test results showing in FIG. 3A, the transformerless AC/DC converting control circuit of the present invention is superior to the prior art. The present invention is capable of adjusting the conducting angle of the first transistor T1 arbitrarily, and easily controlling the output current. Thus, for an input represented by alternating current waveform 1, the output of DC current represented by line 2 is much improved, exhibiting less oscillation than the output shown in FIG. 1A.

It should be noticed that the embodiments and drawings aforementioned only describe and show the basic components and relationships thereof. In order to achieve varied effects, devices such as resistors, can be optionally coupled between these components, and the modified design based on the above embodiments will be within the scope of the present invention.

What is claimed is:

1. A transformerless AC/DC converting control circuit, which is used for a transformerless AC/DC converting apparatus and has a current input contact and a current output contact; and a current flowing through the control circuit is defined as a load current; said control circuit primarily comprising a current-switch circuit, a duty-control circuit and a load-current limiting circuit, wherein:

said current-switch circuit having a current input contact, a current output contact and a control contact, and being used to switch on/off and control the load current in accordance with received output signals from said duty-control circuit and said load-current limiting circuit;

said duty-control circuit having a current input contact, a current output contact and a control contact, and being used to switch on or off said load current when a potential between said input and output contacts of said control circuit is lower or higher than predetermined values; and said load-current limiting circuit having a current input contact, a current output contact and a control contact, and being used to limit said load current by means of said current-switch circuit when said load current is higher than a predetermined value.

2. The circuit of claim 1, wherein:

said control contact of said duty-control circuit, said current input contact of said control circuit and said current input contact of said current-switch circuit are interconnected directly or indirectly by means of a conductive element;

said current input contact of said load-current limiting circuit, said control contact of said current-switch circuit and said current input contact of said duty-control circuit are interconnected directly or indirectly by means of a conductive element;

said current output contact of said current-switch circuit and said control contact of said load-current limiting circuit are interconnected directly or indirectly by means of a conductive element; and said current output contact of said duty-control circuit, said current output contact of said load-current limiting circuit and said current output contact of said control circuit are interconnected directly or indirectly by means of a conductive element.

3. The circuit of claim 1, wherein said current-switch circuit primarily comprises a first transistor and a first resistor; wherein:

one end of said first resistor, said current input contact of said current-switch circuit and said current input end of said first transistor are interconnected directly or indirectly by means of a conductive element;

another end of said first resistor, control end of said first transistor and said control contact of said current-switch circuit are interconnected directly or indirectly by means of a conductive element; and said current output end of said first transistor and said current output contact of said current-switch circuit are interconnected directly or indirectly by means of a conductive element.

4. The circuit of claim 1, wherein said duty-control circuit primarily comprises a second transistor, a second resistor and a third resistor; wherein:

said current input end of said second transistor and said current input contact of said duty-control circuit are interconnected directly or indirectly by means of a conductive element;

one end of said second resistor and said control contact of said duty-control circuit are interconnected directly or indirectly by means of a conductive element;

another end of said second resistor, one end of said third resistor and said control end of said second transistor are interconnected directly or indirectly by means of a conductive element; and another end of said third resistor and said current output end of said second transistor and said current output contact of said duty-control circuit are interconnected directly or indirectly by means of a conductive element.

5. The circuit of claim 4, wherein said duty-control circuit primarily further comprises a forth resistor, which has two ends respectively connected to said current input end of said second transistor and said current input contact of said duty-control circuit, so that said current input end of said second transistor is not directly connected to said current input contact of said duty-control circuit.

6. The circuit of claim 1, wherein said load-current limiting circuit primarily comprises a third transistor and a fifth resistor; wherein:

said current input end of said third transistor and said current input contact of said load-current limiting circuit are interconnected directly or indirectly by means of a conductive element;

one end of said fifth resistor, said control end of said third transistor and said control contact of said load-current limiting circuit are interconnected directly or indirectly by means of a conductive element; and another end of said fifth resistor and said current output end of said third transistor and said current output contact of said load-current limiting circuit are interconnected directly or indirectly by means of a conductive element.

7. The circuit of claim 6, wherein said load-current limiting circuit further comprises a sixth resistor with two ends, wherein:

one end thereof, said control end of said third transistor and said control contact of said load-current limiting circuit are interconnected directly or indirectly by means of a conductive element; and said another end, said current input end of said third transistor and said current input contact of said load-current limiting circuit are interconnected directly or indirectly by means of a conductive element.

8. The circuit of claim 1, which is applied to illuminants or indicators.

9. A transformerless AC/DC converting control circuit, which is used for a transformerless AC/DC converting apparatus and has a current input contact and a current output contact; and a current flowing through said control circuit is defined as a load current; said control circuit primarily comprises a current-switch circuit, a duty-control circuit and a load-current limiting circuit, wherein:

said current-switch circuit having a current input contact, a current output contact and a control contact, and being used to switch on/off and control said load current in accordance with received output signals from said duty-control circuit and said load-current limiting circuit;

said duty-control circuit having a current input contact, a current output contact and a control contact, and being used to switch on or off said load current when a potential between said input and output contacts of said control circuit is lower or higher than predetermined values; and said load-current limiting circuit having a current input contact, a current output contact and a control contact, and being used to limit said load current by means of said current-switch circuit when said load current is higher than a predetermined value;

and additionally, said control contact of said duty-control circuit, said current input contact of said control circuit and said current input contact of said current-switch circuit are interconnected directly or indirectly by means of a conductive element;

said current input contact of said load-current limiting circuit, said control contact of said current-switch circuit and said current input contact of said duty-control circuit are interconnected directly or indirectly by means of a conductive element;

said current output contact of said current-switch circuit and said control contact of said load-current limiting circuit are interconnected directly or indirectly by means of a conductive element; and said current output contact of said duty-control circuit, said current output contact of said load-current limiting circuit and said current output contact of said control circuit are interconnected directly or indirectly by means of a conductive element.

10. The circuit of claim 9, wherein:

said current-switch circuit primarily comprises a first transistor and a first resistor; wherein one end of said first resistor, said current input contact of said current-switch circuit and said current input end of said first transistor are interconnected directly or indirectly by means of a conductive element; another end of said first resistor, control end of said first transistor and said control contact of said current-switch circuit are interconnected directly or indirectly by means of a conductive element; and said current output end of said first transistor and said current output contact of said current-switch circuit are interconnected directly or indirectly by means of a conductive element;

said duty-control circuit primarily comprises a second transistor, a second resistor and a third resistor; wherein said current input end of said second transistor and said current input contact of said duty-control circuit are interconnected directly or indirectly by means of a conductive element; one end of said second resistor and said control contact of said duty-control circuit are interconnected directly or indirectly by means of a conductive element; another end of said second resistor and one end of said third resistor and said control end of said second transistor are interconnected directly or indirectly by means of a conductive element; and another end of said third resistor, said current output end of said second transistor and said current output contact of said duty-control circuit are interconnected directly or indirectly by means of a conductive element; and said load-current limiting circuit primarily comprises a third transistor and a fifth resistor; wherein said current input end of said third transistor and said current input contact of said load-current limiting circuit, one end of said fifth resistor are interconnected directly or indirectly by means of a conductive element; said control end of said third transistor and said control contact of said load-current limiting circuit are interconnected directly or indirectly by means of a conductive element; and another end of said fifth resistor, said current output end of said third transistor and said current output contact of said load-current limiting circuit are interconnected directly or indirectly by means of a conductive element.

* * * * *